(12) United States Patent
Nakajima et al.

(10) Patent No.: US 7,379,553 B2
(45) Date of Patent: May 27, 2008

(54) SOUND SOURCE SEARCH SYSTEM

(75) Inventors: Hirofumi Nakajima, Tokyo (JP); Shinji Ohashi, Tokyo (JP); Hideo Tsuru, Tokyo (JP); Hiroshi Ohyama, Tokyo (JP); Takaaki Yamanaka, Tokyo (JP)

(73) Assignee: Nittobo Acoustic Engineering Co. Ltd, Tokyo (JP)

( * ) Notice: Subject to any disclaimer, the term of this patent is extended or adjusted under 35 U.S.C. 154(b) by 154 days.

(21) Appl. No.: 10/525,908

(22) PCT Filed: Aug. 27, 2003

(86) PCT No.: PCT/JP03/10851

§ 371 (c)(1),
(2), (4) Date: Feb. 25, 2005

(87) PCT Pub. No.: WO2004/021031

PCT Pub. Date: Mar. 11, 2004

(65) Prior Publication Data

US 2005/0246167 A1 Nov. 3, 2005

(30) Foreign Application Priority Data

Aug. 30, 2002 (JP) ............................ 2002-293025

(51) Int. Cl.
*H04R 3/00* (2006.01)
(52) U.S. Cl. ...................................... 381/92
(58) Field of Classification Search ............... 381/92, 381/1, 26, 118, 66, 94.1–94.2, 94.7, 87, 81, 381/345, 2; 700/94; 362/86; 382/86; 704/213
See application file for complete search history.

(56) References Cited

U.S. PATENT DOCUMENTS

| 4,496,022 | A  | * | 1/1985  | Prohs          | 181/175 |
| 4,776,019 | A  | * | 10/1988 | Miyatake       | 381/174 |
| 5,717,656 | A  |   | 2/1998  | Dourbal        |         |
| 6,978,030 | B2 | * | 12/2005 | Reich          | 381/124 |
| 7,054,452 | B2 | * | 5/2006  | Ukita          | 381/92  |
| 2002/0097885 | A1 | * | 7/2002 | Birchfield et al. | 381/92 |

(Continued)

FOREIGN PATENT DOCUMENTS

EP    1 331 490 A1    7/2003

(Continued)

*Primary Examiner*—Xu Mei
*Assistant Examiner*—Lun-See Lao
(74) *Attorney, Agent, or Firm*—Akerman Senterfitt; Stephen A. Pendorf; Yonghong Chen

(57) ABSTRACT

It is possible to simultaneously identify the sound coming direction from a sound source in all directions and estimate the sound intensity of the sound source. A plurality of microphones (11) are arranged on the surface of a baffle (10) of a shape such as a sphere and polyhedron so that sound from all directions are acquired. A calculation device (40) calculates the amplitude characteristic and the phase characteristic of acoustic signals acquired by the microphones (11). The signal information and information on sound field analysis around the baffle are integrated and calculation to emphasize a sound coming from a particular direction is performed for all the directions so as to identify the sound coming direction from a sound source. According to these calculation results and the distance input by an input device (70), it is possible to estimate the sound intensity of the sound source at a plurality of portions generated at the sound source or boundary surface.

8 Claims, 12 Drawing Sheets

U.S. PATENT DOCUMENTS

2002/0181721 A1* 12/2002 Sugiyama et al. ............ 381/92
2003/0147539 A1* 8/2003 Elko et al. .................... 381/92

FOREIGN PATENT DOCUMENTS

| JP | 04-072525 A | 3/1992 |
| JP | 06-113387 A | 4/1994 |
| JP | 7-37908 B2 | 4/1995 |
| JP | 10-332807 A | 12/1998 |
| JP | 11-064089 A | 3/1999 |
| JP | 2002-181913 A | 6/2002 |
| JP | 2003-111183 A | 4/2003 |
| WO | WO 02/29432 A1 | 4/2002 |

* cited by examiner (a)

(c)

(b)

SOUND SOURCE SEARCH SYSTEM

CROSS REFERENCE TO RELATED APPLICATION

This application is a national stage of PCT/JP003/010851 filed Aug. 27, 2003 under the International Convention.

BACKGROUND OF THE INVENTION

1. Field of the Invention

This invention relates to a sound-source-search system that searches for a sound source such as acoustic noise, and more particularly to a sound-source-search system in which a plurality of microphones are arranged at locations on a spherical, semi-spherical or polyhedral baffle surface and/or location separated from the surface, and processes the electrical signals from the sounds obtained from each of the microphones, and estimates the direction from which the sound comes and intensity of the sound source from all directions.

In an electric generation plant, chemical plant, factory having an assembly line, or the like, acoustical noise that is generated from various equipment and machinery such as motors, pumps, fans, transformers, etc., are combined and reach bordering areas or nearby homes. Also, inside transportation means such as automobiles, trains, airplanes, acoustical noises that are generated by the various components such as engines, gears, fans, and the like are combined and inhibit silence inside. Moreover, in normal housing areas such as apartments, and the like, silence inside is inhibited by various noises. In order to solve the problems posed by these acoustical noises, it is necessary to accurately know the direction from which the sound is coming, and the intensity of the sound source.

Conventionally, a sound source was searched for by placing a plurality of microphones over a wide area, recording the acoustical signals obtained by way of those microphones by a recording device such as a tape recorder and processing each of the recorded acoustical signals. However, in this kind of method of searching for a sound source, not only was it necessary to set up a plurality of microphones over a wide area, it was also necessary to wire each of the microphones to a recording device, so the set up work was very complicated.

Also, as a different sound-source-search method is the sound-source-search apparatus disclosed, for example, in Japanese Patent Publication No. H06-113387. This is an apparatus that faces a parabolic reflector in the direction from which the sound is coming and records the acoustic signal to make it possible to visualize the sound source. However, the disadvantage of this method is that the estimated sound source is limited to the direction in which the parabolic reflector is faced. In other words, the recording direction is limited by the location and angle at which the microphone is located, so it is impossible to search for sound sources in all directions at the same time.

In order to solve this problem, in Japanese Patent Publication No. 2003-111183 a sound-source-search system is proposed in which a first to fourth microphone are arranged on a rotating frame that is installed on a base to form a detection unit with an origin point located in the center of a square XY plane, and a fifth microphone is placed above the center of the square formed by the first to fourth microphones such that the distances between the first to fourth microphones and fifth microphone are the same, and the direction from which the sound is coming is estimated from the difference in arrival time of output signals from each microphone.

However, in Japanese Patent Publication No. 2003-111183 described above, the first to fifth microphone are located on a rotating frame, and as can be analogized from the simplified installation work and a single-mounted camera, since it is necessary to rotate the rotating frame in order to search for a sound source in all directions, it is impossible to identify the direction from which the sound is coming and estimate the intensity of the sound source in all directions at the same time. Moreover, since the microphones, camera and accompanying cables are located in a naked state in the space through which the sound propagates, the system is vulnerable to the sound reflected from the microphones, camera and cables themselves, which has a large effect on the results of the search for the sound source.

Taking into consideration the problems described above, the object of this invention is to provide a sound-source-search system that is not limited to a small space and is capable of identifying the direction from which sound is coming and the intensity of the sound source in all directions at the same time.

SUMMARY OF THE INVENTION

The sound-source search system according to the first claim of the invention comprises: a spherical, semi-spherical or polyhedral baffle; a plurality of microphones that are arranged on the surface of the baffle for picking up sound in all directions; an amp that amplifies analog signals, which are electrical signals for the sounds in all directions that were picked up by the plurality of microphones; an A/D converter that converts the analog signals the were amplified by the amp to digital signals; an arithmetic-processing apparatus that performs arithmetic processing on the digital signals that were converted by the A/D converter, and analyzes the direction from which the sound from the sound source comes, and/or estimates the intensity of the sound from the sound source; a memory apparatus for storing the arithmetic-processing results from the arithmetic-processing apparatus; a display apparatus that displays the intensity distribution of the sound from the sound source based on the arithmetic-processing results from the arithmetic-processing apparatus; and an input apparatus for entering the distance to the sound source, or sound sources generated at a plurality of sites on boundary surfaces; and wherein the arithmetic-processing apparatus, by arithmetic processing, finds the amplitude characteristics and phase characteristics of the acoustic signals picked up by the plurality of microphones, after which it combines that signal information with analysis information for the sound field around the baffle, and together with performing arithmetic processing to emphasize the sound coming from a specific direction for all directions, and identifying the direction from which the sound comes, it estimates the intensity of the sound from the sound source or sound source(s) generated at one or more sites on boundary surfaces based on the arithmetic-processing results and distance(s) input from the input apparatus.

Also, it is possible for the system to be such that there are one or more directive or non-directive sound-source elements that generate sound waves arranged on the surface of the baffle; and where the arithmetic-processing apparatus, by arithmetic processing, finds the amplitude characteristics and phase characteristics of each of the reflected sounds that are picked up by the plurality of microphones, after which it combines that signal information with analysis information for the sound field around the baffle, and together with performing arithmetic processing to emphasize the sound coming from a specific direction for all directions, and identifying the direction from which the reflected sound comes, automatically measures the distance from the baffle to the sound source or sound source(s) generated at one or more sites on boundary surfaces by using the time difference from when the test sound was generated to when the reflected sound was picked up; and uses that value as information for estimating the intensity of the sound from the sound source or sound source(s) generated at one or more sites on boundary surfaces, and/or estimating the intensity of the sound reflected from that area.

It is also possible for the system to be such that one or more light-receiving elements are arranged on the surface of the baffle such that their imaging ranges overlap; and where the arithmetic-processing apparatus takes in the images from said one or more light-receiving elements that corresponds to the direction from which a specific sound comes, and combines and displays the image of the direction from which the sound comes and/or intensity of the sound found through arithmetic processing with that image or the result of image processing based on that image.

It is also possible for the system to be such that one or more light sources are arranged on the surface of the baffle; and where the arithmetic-processing apparatus automatically measures the distance from the baffle to sound sources generated at a plurality of sites on boundary surfaces by using the time from when light was generated until the reflected light was taken in; and uses that value as information for estimating the intensity of the sound from the sound source or sound source(s) generated at one or more sites on boundary surfaces.

Furthermore, the system can be such that the arithmetic-processing apparatus performs image processing on the area of the imaging range of the light-receiving elements that overlap, and automatically measures the distance to the sound source or sound source(s) generated at one or more sites on boundary surfaces.

The system can also be such that there is a plurality of baffles; and the arithmetic-processing apparatus finds: the distance from one of the baffles to the sound source or sound source(s) generated at one or more sites on boundary surfaces and/or the direction from which the sound comes; the distance from another baffle to the sound source or sound source(s) generated at one or more sites on boundary surfaces and/or the direction from which the sound comes; and the positional relationship between the baffles; after which, based on this information, uses the theory of triangulation to find the distance to the sound source or sound source(s) generated at one or more sites on boundary surfaces.

Moreover the system can be such that one or more satellite microphones are arranged at locations separated from the surface of the baffle; and where the arithmetic-processing apparatus uses the sound picked up by the plurality of satellite microphones to find the direction from which the sound comes and/or intensity of the sound from the sound source.

Furthermore, the system can be such that the baffle is installed at the top of a long member such that it is held at a specified height above the ground.

In the sound-source search system of this invention, a plurality of microphones are arranged on the surface of a spherical, semi-spherical or polyhedral baffle to pick up sound from all directions, and after an arithmetic-processing apparatus finds through arithmetic processing the amplitude characteristics and phase characteristics of the acoustic signals picked up by the plurality of microphones, it combines that signal information with analysis information for the sound field around the baffle, and together with performing arithmetic processing for emphasizing sound coming from a specific direction for all directions, and identifying the direction from which the sound from the sound source comes, based on the arithmetic processing results and distances input from the input apparatus, it is able to estimate the intensity of the sound from the sound source or sound sources generated at a plurality of sites on boundary surfaces.

DESCRIPTION OF THE PREFERRED EMBODIMENTS

The preferred embodiments of the invention will be explained below.

First Embodiment

Figure 1:
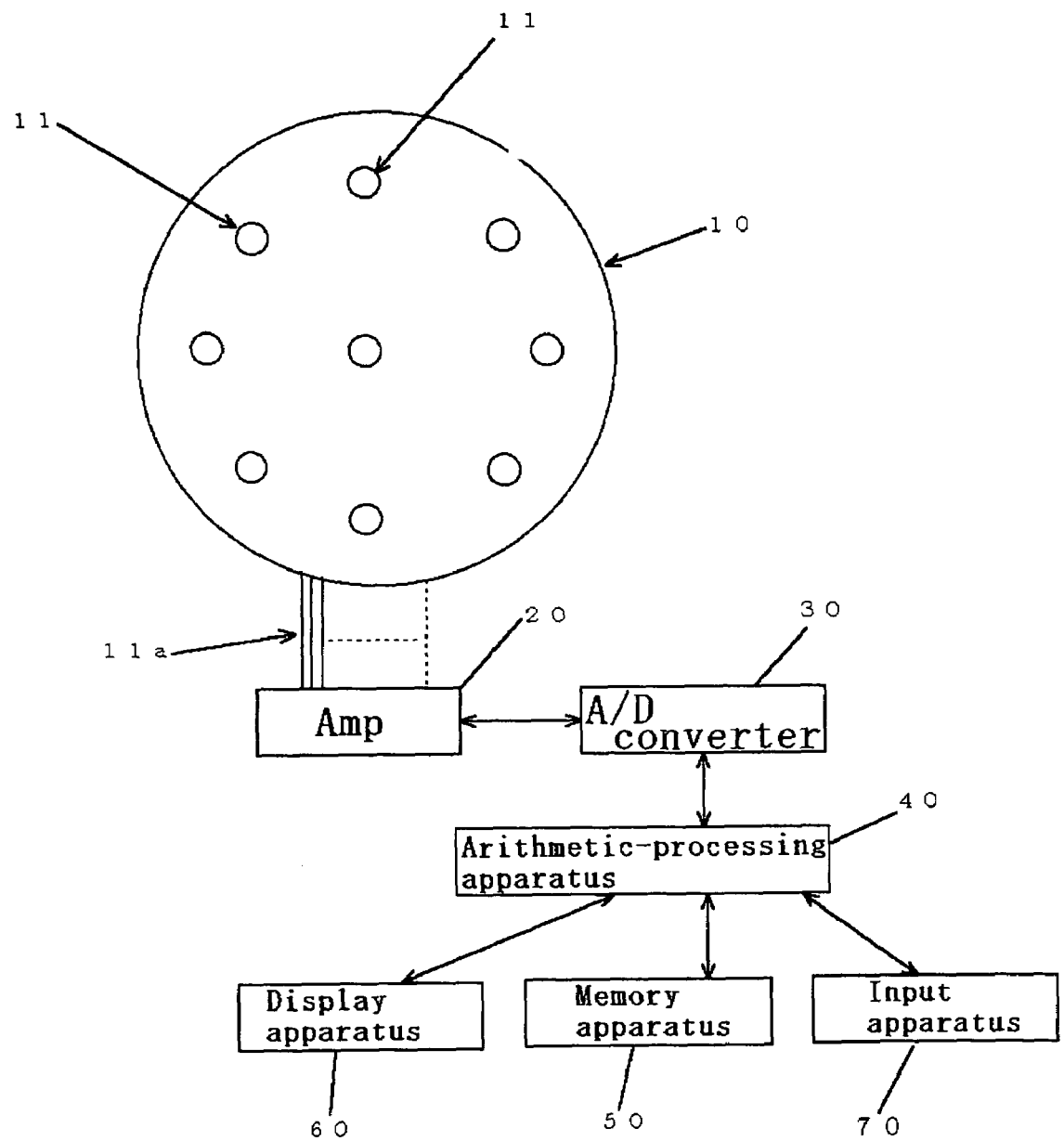
FIG. 1 is a drawing for explaining the basic construction of a first embodiment of the sound-source-search system of the invention.
Figure 2:
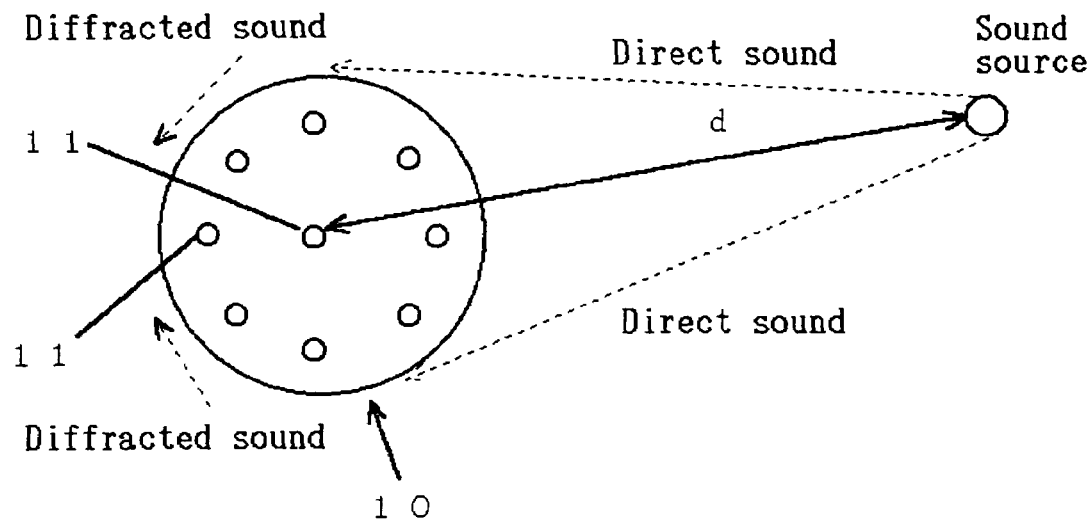
FIG. 2 is a drawing for explaining the sound-source-search method of the sound-source-search system shown in FIG. 1.
Figure 3:
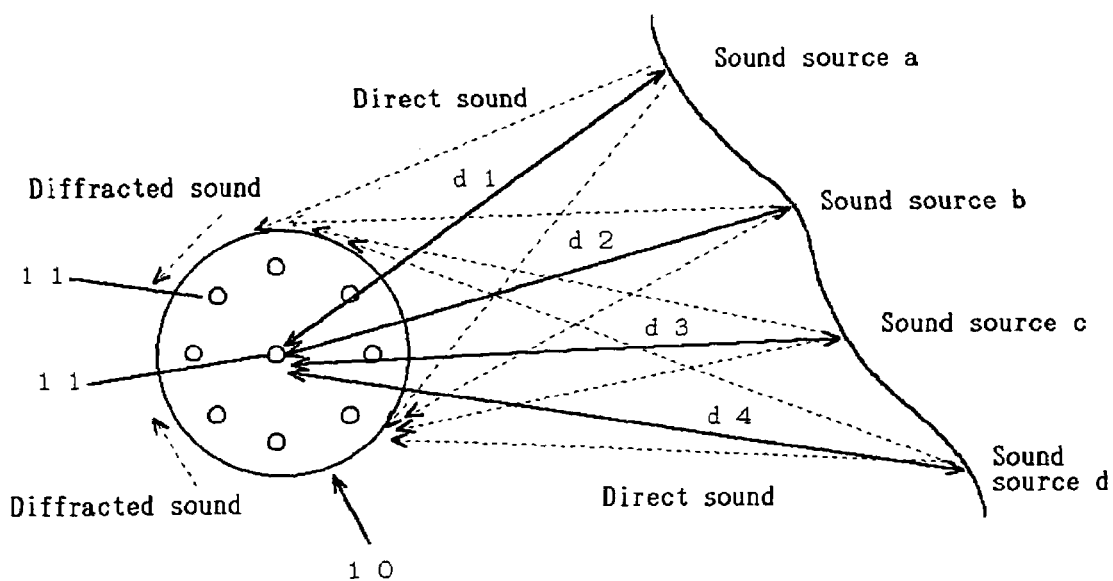
FIG. 3 is a drawing for explaining the sound-source-search method of the sound-source-search system shown in FIG. 1.
Figure 4:
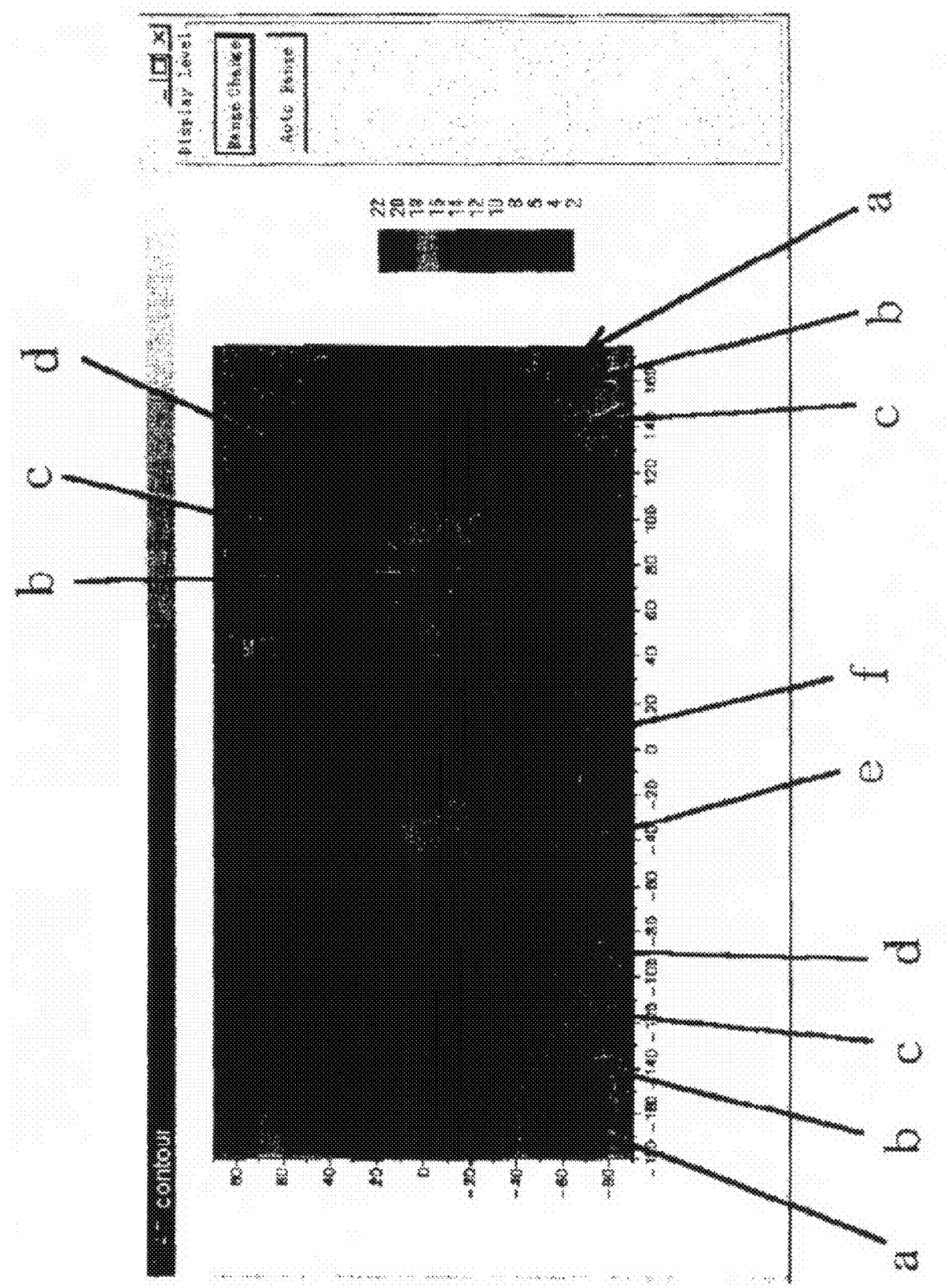
FIG. 4 is a drawing showing an example of the sound intensity distribution shown on the first display apparatus.

FIG. 1 is a drawing for explaining the basic construction of a first embodiment of the sound-source-search system of this invention; FIG. 2 and FIG. 3 are drawings for explaining the sound-source-search method by the sound-source-search system shown in FIG. 1; and FIG. 4 is a drawing showing an example of the sound intensity distribution that is displayed on the display apparatus shown in FIG. 1.

The sound-source-search system shown in FIG. 1 comprises a baffle 10, microphones 11, amp 20, A/D converter 30, arithmetic-processing apparatus 40, memory apparatus 50, display apparatus 60, and input apparatus 70. It is possible for the arithmetic-processing apparatus 40, memory apparatus 50, display apparatus 60 and input apparatus 70 to be constructed using an electronic device such as a notebook computer or desktop computer.

The baffle 10 is spherical. Also, the baffle 10 is installed at the top of a long member (not shown in the figure) such as a pole such that it is kept at a specified height from the ground plane.

A plurality of microphones 11 is arranged on the surface of the baffle 10. It is possible to use dynamic microphones or condenser microphones as the microphones 11.

By placing the plurality of microphones 11 on the spherical baffle 10 in this way, it becomes possible to pick up sound uniformly in all directions. The built-in main unit (not shown in the figure) such as the pre-amp (not shown in the figure) for the microphones 11, and the microphone cables 11a that are connected to the main unit are installed inside the baffle 10.

The radius of the baffle 10 shown in FIG. 1 is about 130 mm. Also, in this embodiment, the number of microphones 11 placed on the baffle 10 is 17. However, the number of microphones 11 can be the minimum number necessary to correspond to the dimensions for searching for a sound source, and it is possible to use 2 microphones when searching for a sound source in one dimension, 3 microphones when searching for a sound source in two dimensions, and 4 microphones when searching for a sound source in 3 dimensions. In this embodiment, in order to improve precision and stability of the results of the sound-source search, 17 microphones are used.

By installing the built-in main unit (not shown in the figure) such as the pre-amp (not shown in the figure) for the microphones 11, and the microphone cables 11a that are connected to the main unit on the inside of the spherical baffle 10 in this way, it is possible to suppress disturbances in the sound field around the baffle 10, and thus it becomes possible to accurately pick up sound from the sound source.

Also, coordinates that indicate the position of each microphone 11 on the baffle 10 in three dimensions (x, y, z) are set, and they are used when the arithmetic-processing apparatus 40 performs arithmetic operations in the sound-source search. By doing so, it becomes possible to identify from which microphone 11 a picked up sound is coming from.

The amp 20 is an amplifier that amplifies the analog signals that are electrical signals of the sounds obtained in all directions by each of the microphones 11. The microphone cables 11a from each of the microphones 11 are connected to the amp 20. Here, there is an insert port corresponding to the coordinates of each of the microphones 11 described above, so when connecting the microphone cables 11a of the microphones 11, the microphone cables 11a are inserted into and connected to the respective insert ports. The A/D converter 30 converts the analog signal that was amplified by the amp 20 to a digital signal.

The arithmetic-processing apparatus 40 performs operations on the digital signal converted by the A/D converter 30, and searches for the sound source by processing sound information picked up by each of the microphones 11 inclusively and as a whole. Here, the sound-source search is analyzing the direction from which the sound arrives from the sound source, and estimating the intensity of the sound from the sound source. The sound-source search will be explained in detail later.

The memory apparatus 50 stores the results of the arithmetic processing by the arithmetic-processing apparatus 40. As the memory apparatus 50, it is possible to use a magnetic-tape memory apparatus that uses magnetic tape as the recording medium, or an optical-disk memory apparatus that uses an optical disk as the recording medium. The display apparatus 60 displays the sound intensity distribution of the sound from the sound source based on the arithmetic processing results from the arithmetic-processing apparatus 40. The input apparatus 70 is used for entering the distance to the sound source or to sound sources generated at a plurality of sites on boundary surfaces such as walls in a room. It is possible to use a keyboard, touch panel or the like as the input apparatus. However, in the case where the purpose is to analyze the direction from which the sound comes, and calculate the acoustical contribution on the location of the baffle, and is not to estimate the intensity of the sound, it is possible to eliminate the input apparatus 70.

Next, the method for performing the sound-source search will be explained.

The search for a sound source can be performed in either a large space or a small space. In a large space, it is preferable that there be no obstacles between the baffle 10 and the sound source being searched for; for example, in a location where a large number of people may congregate, the baffle 10 should be set at a high location where it overlooks the entire space; or in a location such as an airport, the baffle 10 should be set in a location where no buildings or structures will become obstacles. On the other hand, in a small space such as indoors or inside a vehicle, the baffle 10 should be placed in a location where it can overlook the entire space.

Also, as shown in FIG. 2, in the case of analyzing the direction from which the sound arrives from the sound source, analysis information for the sound field, which includes direct or diffracted sound around the baffle 10, is entered into the arithmetic-processing apparatus 40. In this state, each of the microphones 11 picks up the sound from the sound source. Here, when picking up the sound from the sound source, sound is basically picked up by each of the microphones 11 at the same time. Also, with a specified microphone as a reference, it is possible to pick up the sound in the order of the coordinates mentioned above, or to pick up the sound with a plurality of microphones together, or to pick up the sound randomly at the same time as the reference microphone. However, the condition when not recording the sounds from all of the microphones at the same time is that the sound from the sound source must not change over time.

At this time, the sound from all directions obtained by way of each of the microphones 11 enters the amp 20 as analog signals, and those signals are amplified by the amp 20 and output. The analog signals that are amplified by the amp 20 are converted to digital signals by the A/D converter 30 and then taken in by the arithmetic-processing apparatus 40.

In the arithmetic-processing apparatus 40, analysis of the sound picked up by each of the microphones 11 is performed by arithmetic processing. In this case, the amplitude characteristics and phase characteristics of each of the acoustic signals picked up by each of the microphones 11 are found by arithmetic processing. Also, after these amplitude characteristics and phase characteristics have been found, analysis information for the sound field around the baffle 10 described above is added, and arithmetic processing, which emphasizes the sound coming from a specified direction, is performed in all directions, making it possible to identify through arithmetic processing the direction from which the sound from the sound source comes.

Next, when estimating the intensity of the sound from the sound source, the distance d to the sound source shown in FIG. 2 is entered into the arithmetic-processing apparatus 40 from the input apparatus 70. At this time, the direction from which the sound from the sound source comes and the sound pressure are identified by the arithmetic-processing apparatus 40 as described above, so it is possible to estimate the intensity of the sound from the sound source through arithmetic processing from these arithmetic processing results and the distance d to the sound source. When estimating the intensity of the sound from the sound source, by adding the distance d to the sound source to the conventional frequency domain beam forming method, it is possible to more accurately estimate the intensity of the sound from the sound source.

In this example, the case was explained in which, after analysis of the direction from which the sound from the sound from the sound source comes is finished, the distance d to the sound source used for estimating the intensity of the sound from the sound source is input to the arithmetic-processing apparatus 40 from the input apparatus 70, however, of course it is also possible to enter the distance d to the sound source into the arithmetic-processing apparatus 40 from the input apparatus 70 before starting the sound-source search.

Also, in this example, as shown in FIG. 2, the case of analyzing the direction from which the sound from one sound source comes, and estimation of the intensity of the sound from one sound source was explained, however, as shown in FIG. 3, in the case of analyzing the directions from which sound comes from a plurality of sound sources generated at sites on boundary surfaces such as walls in a room, and estimating the intensity of the sound sources at each of these sites, it is possible to enter distances d1 to d4 to the sound sources a to d at these sites.

After analyzing the direction from which the sound from the sound source comes and estimating the intensity of the sound from the sound source by arithmetic processing by the arithmetic-processing apparatus 40 as described above, the results of the arithmetic process are displayed in color by the display apparatus 60 as the sound-intensity distribution. FIG. 4 shows an example of the sound-intensity distribution that is displayed by the display apparatus 60. In FIG. 4, the size of the sound intensity is indicated, for example, by a to f(a>f>c>d>e>f).

In this first embodiment, a plurality of microphones 11 are arranged on the surface of a spherical baffle 10 and sound is picked up from all directions in this way, and after the amplitude characteristics and phase characteristics of each of the acoustic signals picked up by the plurality of microphones 11 are found through arithmetic processing by the arithmetic-processing apparatus 40, that signal information is combined with the analysis information for the sound field around the baffle, and arithmetic processing to emphasize the sound coming from a specific direction is performed for all directions, and together with identifying the direction from which sound from the sound source comes through arithmetic processing, the intensity of the sound from the sound source or from sound sources generated at a plurality of sites on boundaries is estimated from the arithmetic processing results and the distance entered from the input apparatus 70, so regardless of whether or not the space is small, it is possible to identify the direction from which the sound from the sound source comes, and estimate the intensity of the sound from the sound source at the same time in all directions.

Also, in this first embodiment, set up work is very easy since it requires just setting a baffle 10 having a plurality of microphones 11 installed in place, and then connecting the microphone cables 11a from the microphones 11 to the amp 20.

In this first embodiment, the case where the baffle 10 was spherical was explained, however, the invention is not limited to this example, and it is possible for the baffle 10 to be semi-spherical or polyhedral. Any one of the cases is possible as long as analysis information for the diffracted sound around the baffle 10 can be obtained in some form. In this way, even when the baffle 10 is semi-spherical or polyhedral, the microphones 11 are built-in the baffle, so it is possible to suppress distortion in the sound field around the baffle 10, and thus it is possible to perform the sound-source search accurately.

Also, the material used for the baffle 10 can be any material, such as stainless steel, aluminum alloy, copper alloy or the like, that retains sufficient strength after a plurality of microphones 11 has been built in. It is possible to perform polishing or roughing of the surface of the baffle 10, and it is also possible to attach sound absorption material. In any case, as long as it is possible to obtain analysis information for diffracted sound around the baffle 10 due to the shape or material of the baffle 10, it is possible to accurately analyze the direction from which the sound from the sound source comes, and estimate the intensity of the sound source even though the shape and material of the baffle 10 may differ.

Second Embodiment

Figure 5:
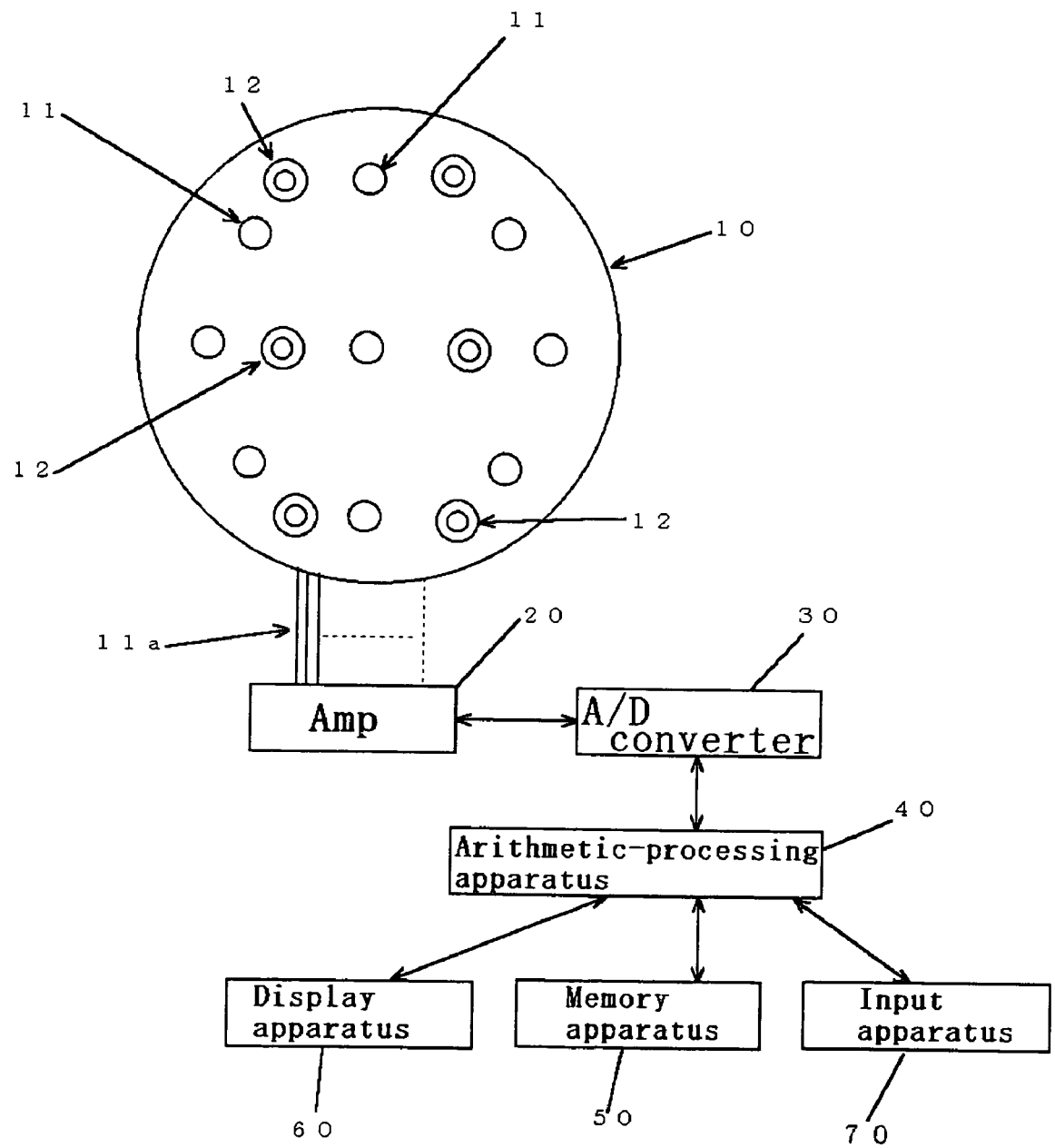
FIG. 5 is a drawing showing a second embodiment in which one or more sound-source elements for measuring distance are added to the baffle shown in FIG. 1.

FIG. 5 is a drawing showing a second embodiment in which one or more sound source elements for measuring distance are added to the baffle 10 shown in FIG. 1. In the drawing explained below, the same reference numbers are used for parts that are in common with those of FIG. 1 to FIG. 3, and any redundant explanation will be omitted.

In this second embodiment shown in FIG. 5, there are one or more sound-source elements 12 for measuring distance placed on the surface of the baffle 10 and they generate sound waves. It is possible to use directive or non-directive acoustical speakers or ultrasonic speakers as the sound-source elements 12 for measuring distance.

With this kind of construction, sound waves are generated from the sound-source elements 12 for measuring distance, and the reflected waves of those waves are picked up by each of the microphones 11, and then after the amplitude characteristics and phase characteristics of each of the reflected waves picked up by each of the microphones 11 have been found through arithmetic processing by the arithmetic-processing apparatus 40, that signal information is combined with the analysis information for the sound field around the baffle 10, and by adding the time from when the sound waves are generated until the reflected waves are picked up together with performing arithmetic processing to emphasize the sound coming from a specified direction in all directions, and identifying the direction from which sound from the boundary surfaces comes from through arithmetic processing, it is possible to automatically measure the distance to the sound source or to sound sources generated at a plurality of sites on the boundary surfaces.

By automatically measuring the distance to the sound source or one or more sound sources generated at a plurality sites on boundary surfaces in this way, not only is it possible to more accurately analyze the direction from which the sound from the sound source comes and estimate the intensity of the sound from the sound source, but it is also possible to gain a better understanding beforehand of buildings, obstacles, mountains near the observed area, or the shape and location inside a vehicle or room.

Moreover, by analyzing the reflected sound characteristics such as the direction from which a test sound generated by a sound-source element 12 for measuring distance and its reflected sound comes for every direction, intensity, and phase, it becomes possible to also investigate the acoustics such as the reverberation time at that place and the echo time pattern.

It is also possible to use a test wave having a specific frequency as the sound wave from the sound-source element 12 for measuring distance, and it is also possible to use random noise, pseudo random noise, an M-sequence signal, a frequency-sweep signal, or the like to perform arithmetic processing and automatically measure the distance to sound sources at one or more sites. After measuring the distance to the sound source or sound sources generated at a plurality of sites on the boundary surfaces in this way, it is possible to more accurately analyze the direction from which sound from the sound source comes, and estimate the intensity of the sound from the sound source.

Third Embodiment

Figure 6:
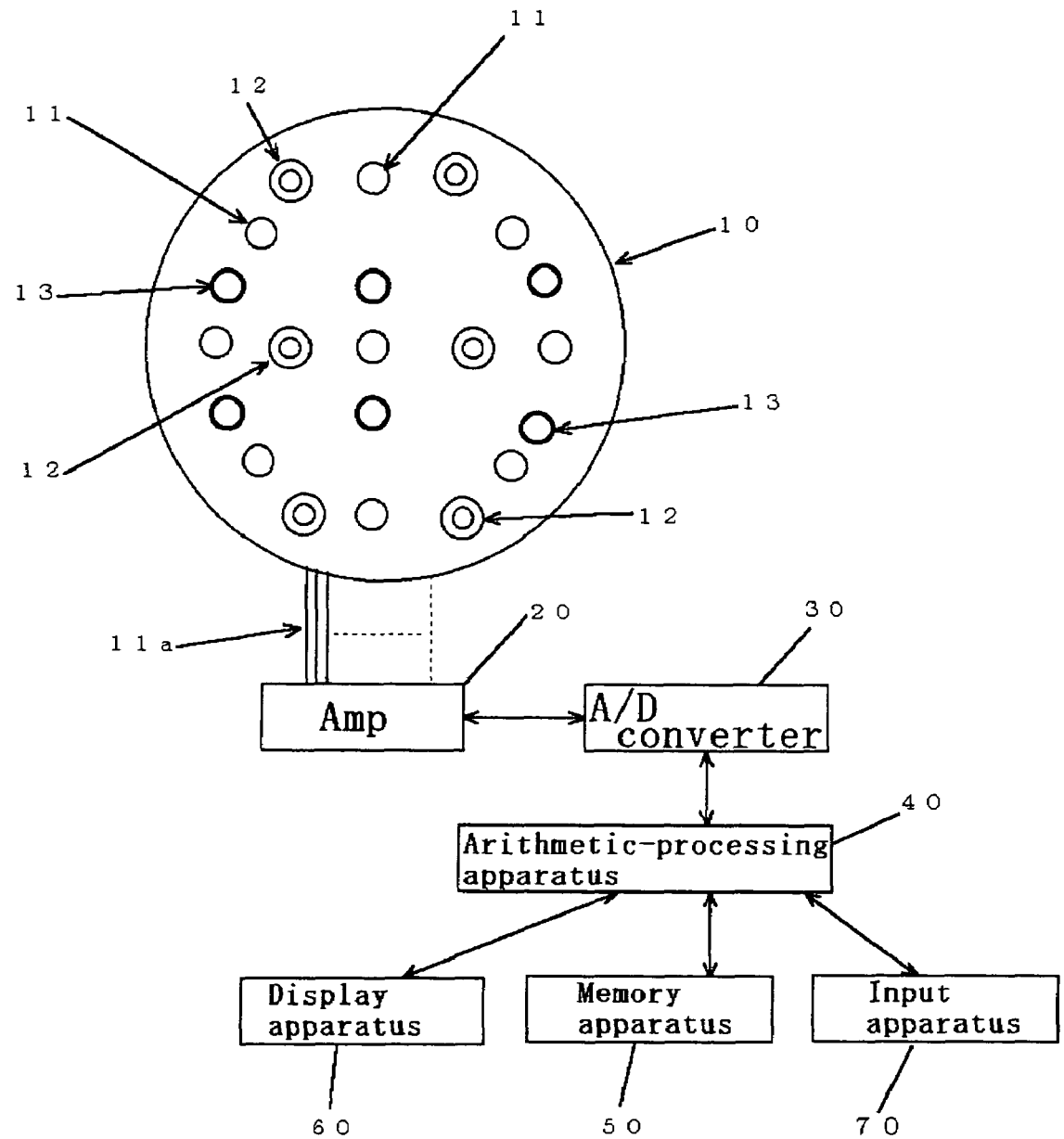
FIG. 6 is a drawing showing a third embodiment in which one or more light-receiving elements are added to the baffle shown in FIG. 5.

FIG. 6 is a drawing showing a third embodiment in which one or more light-receiving elements are added to the baffle 10 shown in FIG. 5.

In this third embodiment shown in FIG. 6, one or more light-receiving elements 13 are arranged on the surface of the baffle 10. It is possible to use a camera such as a CCD camera comprising a CCD (Charge Coupled Device) and lens, a laser-receiving element, infrared-ray-receiving element or the like as the light-receiving element 13.

Figure 7:
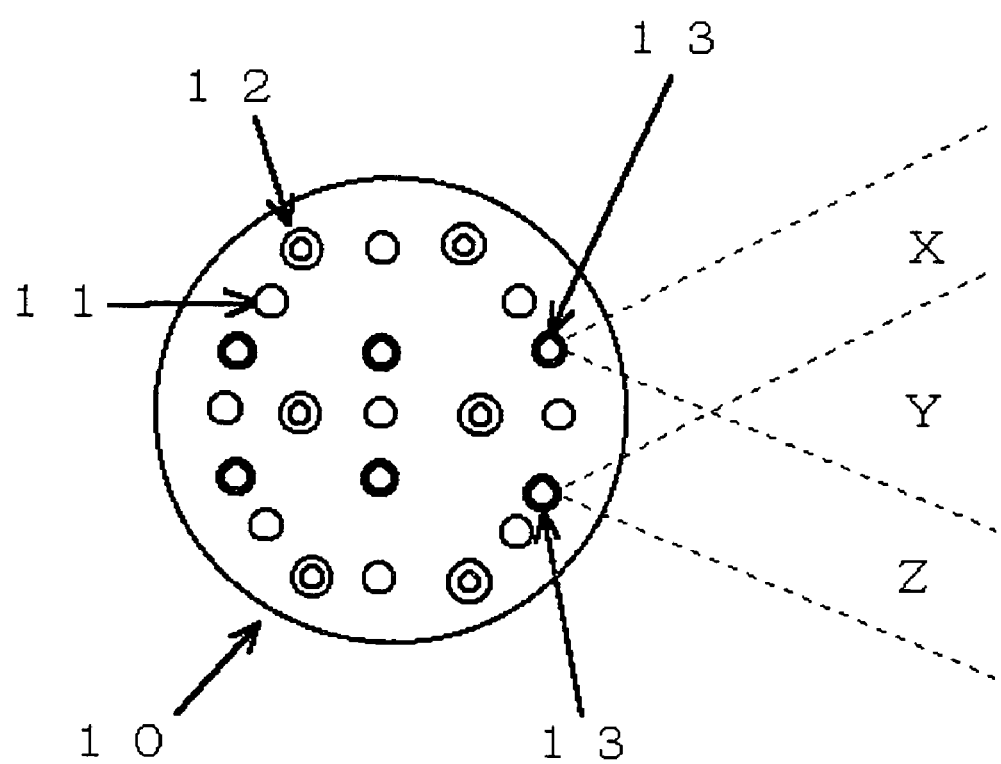
FIG. 7 is a drawing for explaining the operation of the one or more light-receiving elements shown in FIG. 6.

In the case of a camera as the light-receiving element 13, it is preferred that each light-receiving element 13 be placed such that its imaging range overlaps that of the adjacent light-receiving elements. In other words, as shown in FIG. 7, by having the light-receiving element 13 take an image of the image range X and Y, and the other adjacent light-receiving element 13 take an image of the image range Y and Z, the image ranges Y overlap.

Figure 8:
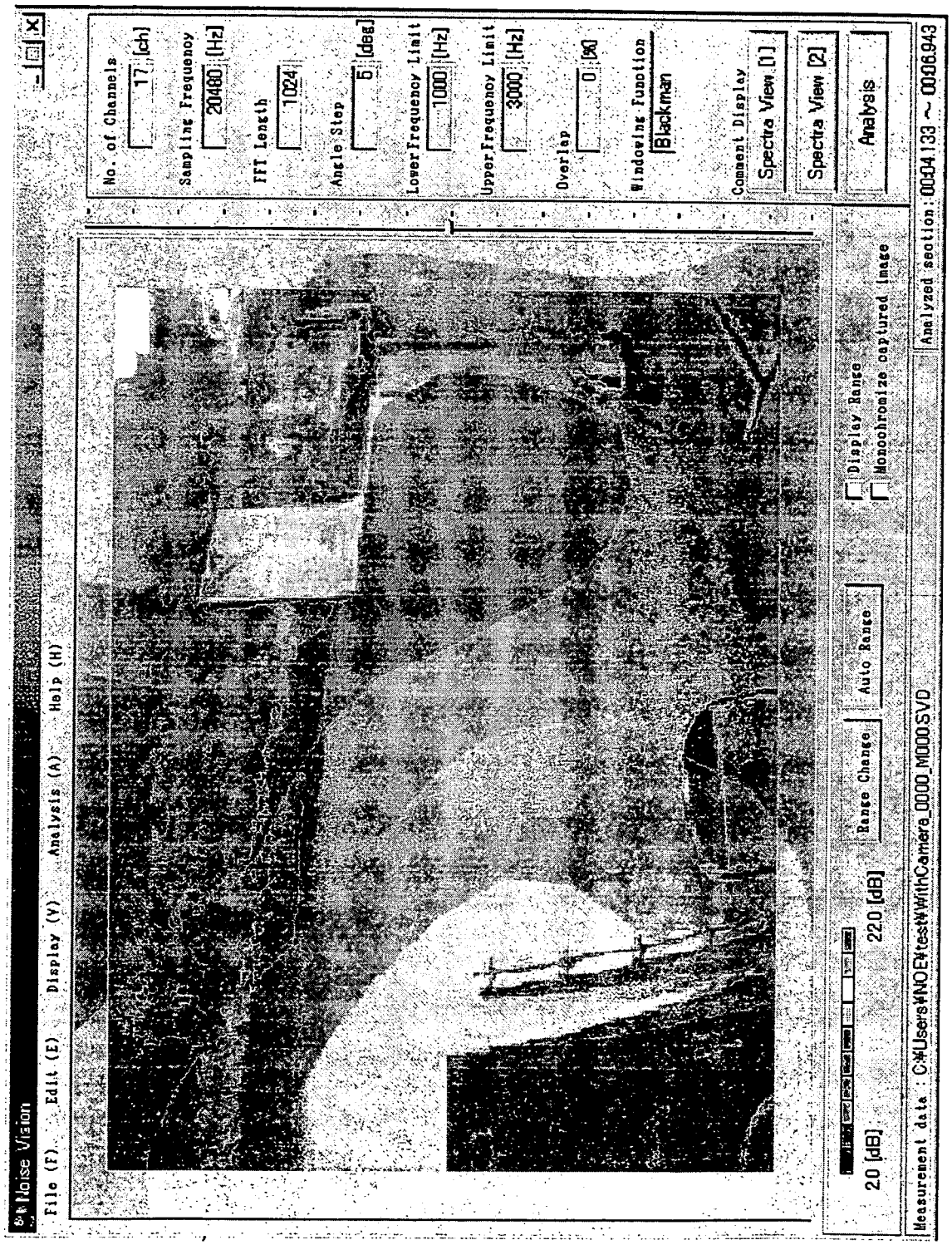
FIG. 8 is a drawing showing an example of the image displayed in color on the display apparatus shown in FIG. 6.

With this kind of construction, since a plurality of light-receiving elements 13 are arranged on the surface of the baffle 10 such that the image ranges overlap, it is possible to automatically take in an image of around the sound source or sound sources generated at a plurality of sites on the boundary surfaces that correspond to the direction from which a specific sound comes, and to display that obtained image in color by the display apparatus 60. FIG. 8 shows an example of the image displayed by the display apparatus 60.

Figure 9:
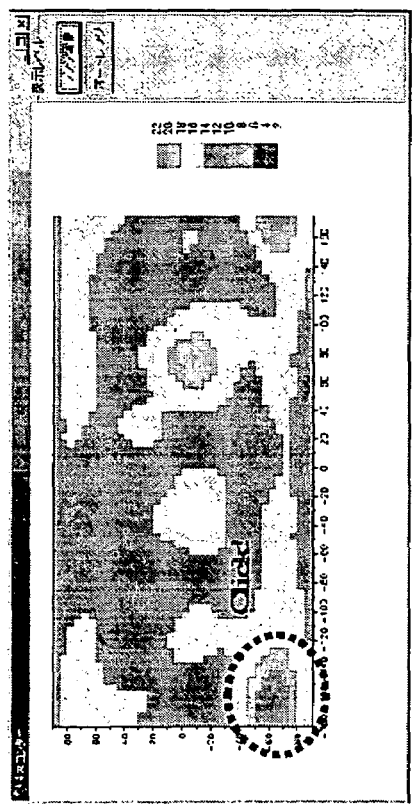
FIGS. 9A, 9B and 9C are drawings showing an example of the image displayed in color on the display apparatus shown in FIG. 6.
Figure 9:
Figure 9:

Moreover, it is possible to combine and display the image of the sound-intensity distribution shown in FIG. 4 with the image shown in FIG. 8. In that case, by selecting the area indicated by the dotted line in the image shown in FIG. 9A corresponds to the image shown in FIG. 4, the image corresponding to that selected area is obtained as shown in FIG. 9B, and the sound-intensity distribution of the area selected in FIG. 9A is combined with the image shown in FIG. 9B as shown in FIG. 9C and displayed.

By automatically taking images with the light-receiving elements 13 in this way, in addition to the effects described above, it is possible to display the direction from which the sound comes and/or the sound-intensity distribution, and thus it becomes easy to visually grasp those distributions.

When a laser-receiving element, infrared-ray-receiving element or the like is used as the light-receiving element 13, they are effectively used in a fourth embodiment described below.

Fourth Embodiment

Figure 10:
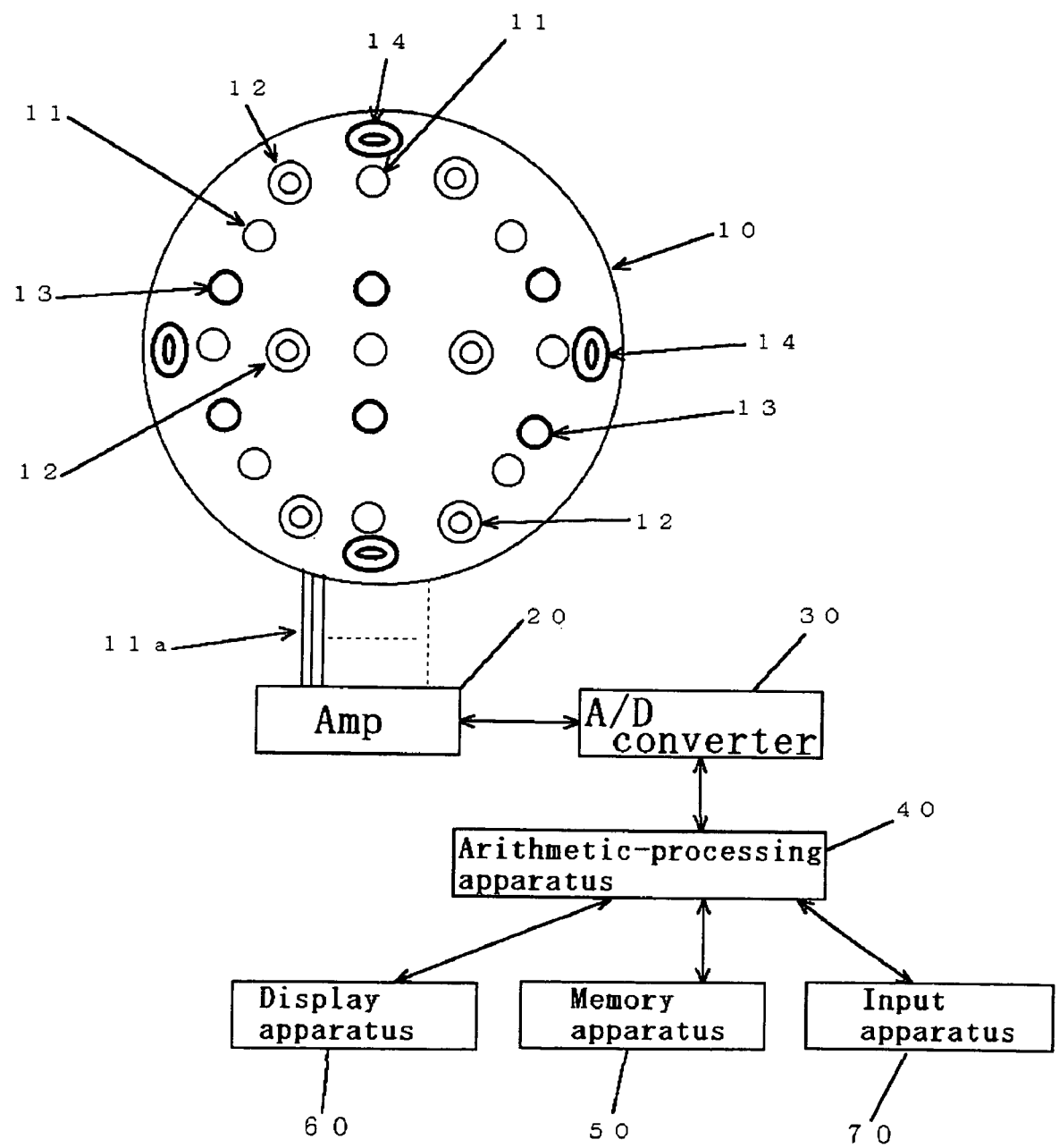
FIG. 10 is a drawing showing a fourth embodiment in which one or more light sources are added to the baffle shown in FIG. 6.

FIG. 10 is a drawing showing a fourth embodiment in which a plurality of light sources is added to the baffle 10 shown in FIG. 6.

In this fourth embodiment shown in FIG. 10, a plurality of light sources 14 is arranged on the surface of the baffle 10. It is possible to use CCD-camera lighting, a laser pointer, a laser range finder, strobe or the like as the light source 14.

When a light source having sharp directivity such as a laser pointer is used in this kind of construction, it is possible to accurately set the installation location of the baffle even when installing the baffle in difficult locations.

When a range finder such as a laser range finder is used in this kind of construction, light is emitted from the light source 14, and the reflected light of that light is received by the light-receiving unit 13, making it possible to automatically measure the distance to the boundary surface, which can be the baffle or sound source.

Also, by using the light generated by the light source 14, it is possible to light up the area of the sound source or sound sources generated at a plurality of sites on the boundary surfaces, so even in an area with dim lighting, it is possible to take good images with the light-receiving elements 13.

When a strobe light source is used as the light from the light source 14, by shining a light onto a rotating body and keeping the flashing period of the light from the light source 14 constant, then by measuring the period when the rotating flashing period and rotation cycle match and the rotating body appears to be still, it is possible to remotely measure the speed of the rotating body. Also, similarly, when the flashing period of the light is constant and it is shown onto a vibrating surface, using the theory of the stroboscope, it becomes possible for the light-receiving elements 13 to observe the vibration state of a boundary surface, which is the sound source.

Fifth Embodiment

Figure 11:
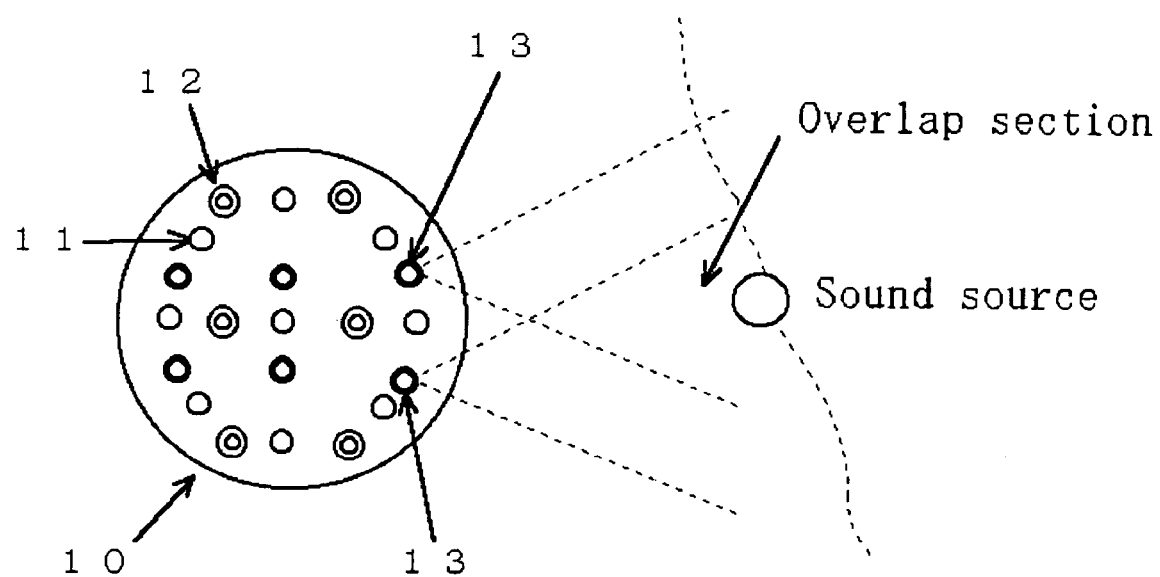
FIG. 11 is a drawing for explaining a fifth embodiment in which the distances to sound sources or sound sources generated at one or more sites on the boundary surface are automatically measured by the light-receiving elements of the baffle shown in FIG. 6.

FIG. 11 is a drawing explaining a fifth embodiment in which the light-receiving elements 13 shown in FIG. 6 automatically measure the distance to the sound source or sound sources generated at a plurality of sites on the boundary surfaces.

In this fifth embodiment shown in FIG. 11, similar to as was explained above, after images have been automatically taken by the light-receiving elements 13, the images where the imaging range of adjacent light-receiving elements 13 overlap are processed, and the distance to the sound source or sound sources generated at a plurality of sites on the boundary surfaces is automatically measured. By having the light-receiving elements 13 automatically take images in this way and then having the arithmetic-processing apparatus 40 process the image of the overlapping area, and automatically measure the distance to the sound source, then similar to as was described above, it becomes possible to accurately estimate the intensity of the sound from the sound source or sound sources generated at a plurality of sites on the boundary surfaces.

Sixth Embodiment

Figure 12:
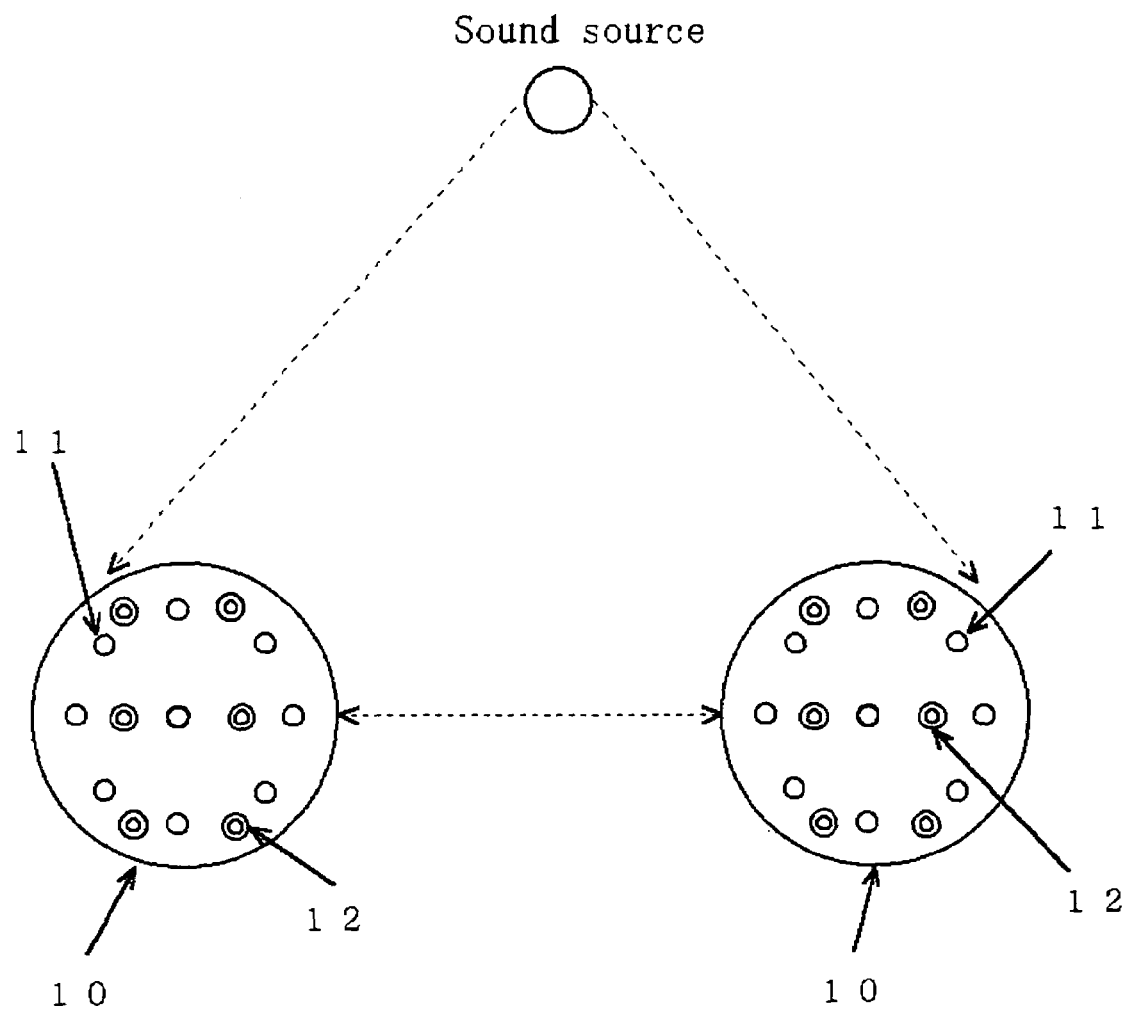
FIG. 12 is a drawing showing a sixth embodiment in which two baffles as shown in FIG. 6 are used.

FIG. 12 is a drawing showing a sixth embodiment in which, as an example of having a plurality of the baffles 10 shown in FIG. 6, two baffles 10 are used.

In this sixth embodiment shown in FIG. 12, by having two baffles 10, through arithmetic processing by the arithmetic-processing apparatus 40, it is possible to obtain the distance from one baffle 10 to the sound source and/or the direction from which the sound comes, the distance from the other baffle 10 to the sound source and/or direction from which the sound comes, and the positional relationship between the pair of baffles 10. Also, based on that information, the distance to the sound source is even more accurately measured according to the theory of triangulation, and of course, it is possible to more accurately measure the intensity of the sound from the sound source; and compared with the case of using only one baffle, when the number of microphones used is increased, the range of received sound is expanded, and it becomes possible to greatly improve the precision of the sound-source search.

Seventh Embodiment

Figure 13:
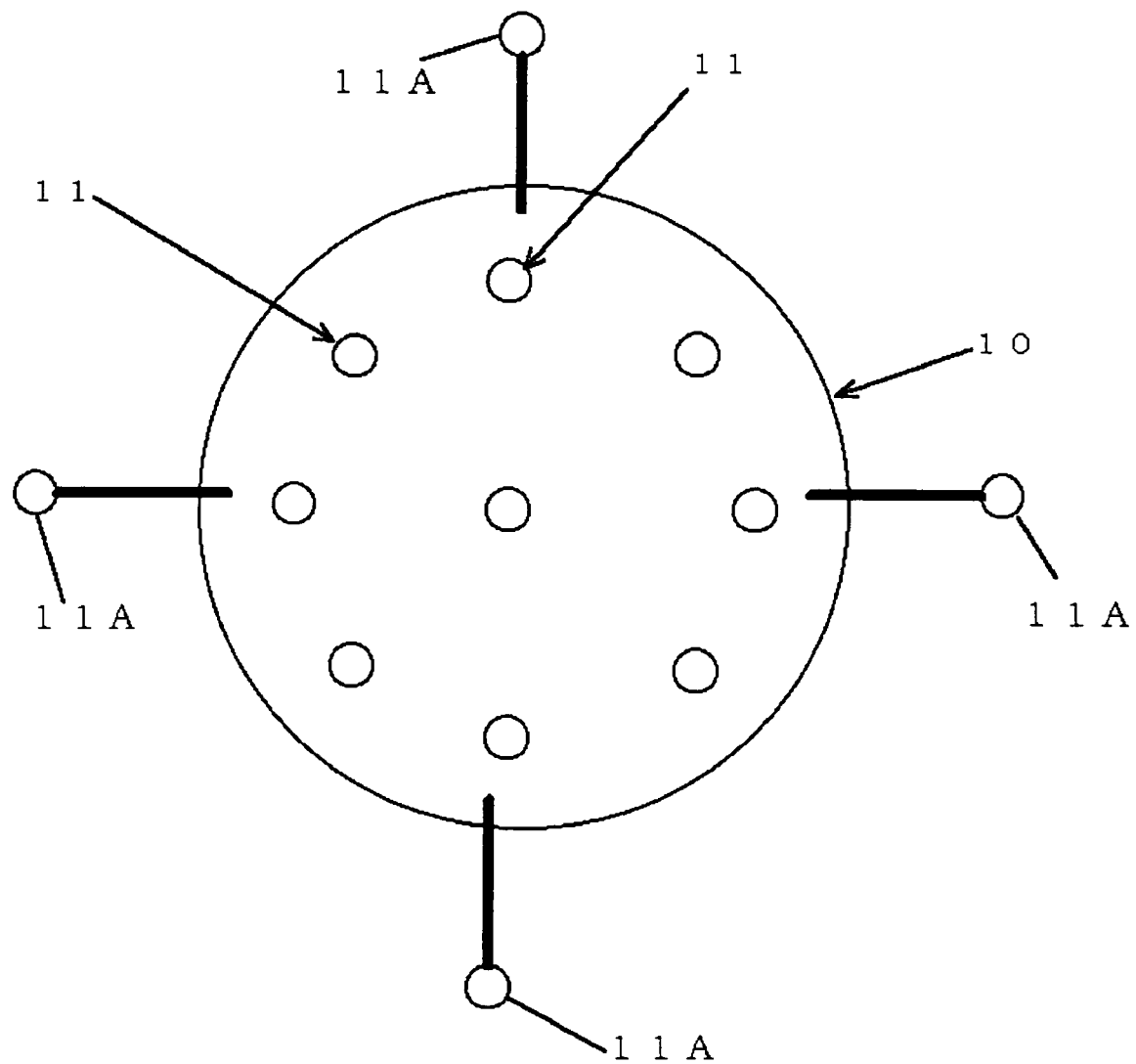
FIG. 13 is a drawing showing a seventh embodiment in which one or more satellite microphones are located on the baffle shown in FIG. 1.

FIG. 13 is a drawing showing a seventh embodiment in which a plurality of satellite microphones is located on the baffle 10 shown in FIG. 1.

In this seventh embodiment shown in FIG. 13, a plurality of satellite microphones 11A is arranged on the baffle 10.

By arranging a plurality of satellite microphones 11A on the baffle 10 in this way, in addition to the built-in microphones on the baffle 10, the arithmetic-processing apparatus 40 is able to use acoustic information from the satellite microphones in the sound-source search. As in the case of the microphones arranged on the baffle 10, it is preferred that the acoustic information from the satellite microphones 11A be used in a form in which analysis information about the diffracted sound around the baffle 10 has been added. The satellite microphones 11A are located further outside than the baffle 10, and have the effect of virtually increasing the size of the baffle 10 without having to change the size of the baffle 10. Since the number of microphones that can be used in the sound-source search is increased, it becomes possible to greatly increase the precision of the sound-source search.

In this seventh embodiment, the case of placing a plurality of satellite microphones 11A around the baffle 10 shown in FIG. 1 was explained, however, the invention is not limited to this example, and of course it is also possible to place a plurality of satellite microphones 11A around the baffle 10 shown in FIG. 5, FIG. 6, FIG. 10 or FIG. 12. Naturally, it is also possible to replace the microphones on the baffle completely with satellite microphones.

INDUSTRIAL APPLICABILITY

With the sound-source search system of this invention as described above, one or more microphones are arranged on and/or near the surface of a spherical, semi-spherical or polyhedral baffle to pick up sound from all directions, and after an arithmetic-processing apparatus identifies the direction from which sound comes through arithmetic processing that focuses on the amplitude characteristics and phase characteristics of the acoustic signals picked up by the plurality of microphones, the intensity of the sound from the sound source or sound sources generated at a plurality of sites on boundary surfaces is estimated from the arithmetic processing results and distances entered from an input apparatus or measured by sound-source, light-source or image processing, so regardless of whether or not the space is small, it is possible to identify the direction from which sound from the sound source comes, and to estimate the intensity of the sound source in all directions at the same time.

What is claimed is:

1. A sound-source search system comprising:
    a spherical, semi-spherical or polyhedral baffle;
    a plurality of microphones arranged on the surface of said baffle for picking up sound in all directions, wherein a built-in main unit such as a pre-amp for said microphones that is connected to the main unit on an inside of said baffle is installed to suppress disturbances in the sound field around said baffle and to accurately pick up sound from the sound source;
    an amp that amplifies analog signals, which are electrical signals for the sounds in all directions that were picked up by said plurality of microphones;
    an A/D converter that converts the analog signals that were amplified by said amp to digital signals;
    an arithmetic-processing apparatus that performs arithmetic processing on the digital signals that were convened by said A/D converter, and analyzes the direction from which the sound from the sound source comes, and/or estimates the intensity of the sound from the sound source;
    a memory apparatus for storing the results of the arithmetic processing by said arithmetic-processing apparatus;
    a display apparatus that displays as a contour display in color the intensity distribution of the sound from the sound source based on the results of the arithmetic processing by said arithmetic-processing apparatus; and
    an input apparatus for entering the distance to the sound source, or sound sources generated at a plurality of sites on boundary surfaces; and wherein
    said arithmetic-processing apparatus, by arithmetic processing, finds the amplitude characteristics and phase characteristics of each of the acoustic signals picked up by said plurality of microphones, after which it combines that signal information with analysis information for the sound field around said baffle, and together with performing arithmetic processing to emphasize the sound coming from a specific direction for all directions, and identifying the direction from which the sound comes, by adding the distance to the sound source to the conventional frequency domain beam forming method, it estimates accurately the intensity of the sound from the sound source or sound sources generated at one or more of sites on boundary surfaces in all directions, so regardless of whether or not the space is small, based on the arithmetic-processing results and said distance to the sound source and sound sources generated at a plurality of sites on boundary surfaces input beforehand from said input apparatus at the same time.

2. The sound-source-search system of claim 1 further comprising one or more directive or non-directive sound-source elements that generate sound waves and that are arranged on the surface of said baffle; wherein
    said arithmetic-processing apparatus, by arithmetic processing, finds the amplitude characteristics and phase characteristics of each of the reflected sounds that are picked up by said plurality of microphones, after which it combines that signal information with analysis information for the sound field around said baffle, and together with performing arithmetic processing to emphasize the sound coming from a specific direction for all directions, and identifying the direction from which the reflected sound comes, automatically measures the distance from the baffle to the sound source or sound sources generated at one or more sites on boundary surfaces by using the time difference from when the test sound was generated to when the reflected sound was picked up; and uses that value as information for estimating the intensity of the sound from the sound source or sound sources generated at one or more sites on boundary surfaces, and/or estimating the intensity of the sound reflected from that area.

3. The sound-source-search system of claim 2 further comprising one or more light-receiving elements that are arranged on the surface of said baffle such that the imaging ranges overlap; and wherein said arithmetic-processing apparatus takes in the image from said one or more light-receiving elements that corresponds to the direction from which said specific sound comes, and combines and displays the image of the arrival direction and/or intensity of the sound distribution found through said arithmetic processing with that image or the result of image processing based on that image.

4. The sound-source-search system of claim 3 further comprising one or more light sources that are arranged on the surface of said baffle; and wherein said arithmetic-processing apparatus automatically measures the distance from said baffle to sound sources generated at a plurality of sites on boundary surfaces by using the time from when light was generated until the reflected fight was taken in; and uses that value as information for estimating the intensity of the sound from the sound source or sound sources generated at one or more sites on boundary surfaces.

5. The sound-source search system of claim 4 wherein, said arithmetic-processing apparatus performs image processing on the area of the imaging range of said light-receiving elements that overlap, and automatically measures the distance to the sound source or sound sources generated at one or more sites on boundary surfaces.

6. The sound-source-search system of claim 5 comprising a plurality of said baffles; and wherein said arithmetic-processing apparatus finds: the distance from one of tho baffles to the sound source or sound sources generated at one or more sites on boundary surfaces and/or the direction from which the sound comes; the distance from other said baffle to the sound source or sound sources generated at one or more sites on boundary surfaces and/or the direction from which the sound comes; and the positional relationship between said baffles; alter which, based on this information, uses the theory of triangulation to find the distance to the sound source or sound sources generated at one or more sites on boundary surfaces.

7. The sound-source-search system of claim 6, further comprising one or more satellite microphones that are arranged at locations separated from the surface of said baffle; and wherein said arithmetic-processing apparatus uses the sound picked up by said plurality of satellite microphones to find the direction from which the sound comes and/or intensity of the sound from the sound source.

8. The sound-source-search apparatus of claim 7 wherein said baffle is installed at the top of a long member such that it is held at a specified height above the ground.

* * * * *